(12) United States Patent
Khan et al.

(10) Patent No.: US 7,411,972 B2
(45) Date of Patent: Aug. 12, 2008

(54) LINK LAYER DEVICE WITH NON-LINEAR POLLING OF MULTIPLE PHYSICAL LAYER DEVICE PORTS

(75) Inventors: Asif Q. Khan, Austin, TX (US); David B. Kramer, Austin, TX (US)

(73) Assignee: Agere Systems Inc., Allentown, PA (US)

( * ) Notice: Subject to any disclaimer, the term of this patent is extended or adjusted under 35 U.S.C. 154(b) by 986 days.

(21) Appl. No.: 10/768,764

(22) Filed: Jan. 30, 2004

(65) Prior Publication Data
US 2005/0169298 A1  Aug. 4, 2005

(51) Int. Cl.
*H04L 12/403* (2006.01)
*H04L 12/56* (2006.01)
*H04J 14/00* (2006.01)

(52) U.S. Cl. .................. 370/449; 370/423; 370/426; 370/429; 710/109

(58) Field of Classification Search .............. 370/389, 370/395.21, 412, 422, 423, 426, 428, 429, 370/449; 710/100, 107, 109
See application file for complete search history.

(56) References Cited

U.S. PATENT DOCUMENTS

| | | | | |
|---|---|---|---|---|
| 6,671,758 B1 * | 12/2003 | Cam et al. | ................... | 710/100 |
| 6,735,773 B1 * | 5/2004 | Trinh et al. | ................... | 719/328 |
| 6,850,523 B1 * | 2/2005 | Karr et al. | .............. | 370/395.21 |
| 6,854,025 B2 * | 2/2005 | Knight et al. | .................. | 710/22 |
| 7,007,095 B2 * | 2/2006 | Chen et al. | ................... | 709/230 |
| 7,110,358 B1 * | 9/2006 | Clinton et al. | ............... | 370/235 |
| 7,111,102 B2 * | 9/2006 | Doak et al. | .................. | 710/305 |
| 7,159,061 B2 * | 1/2007 | Khan et al. | ................... | 710/305 |
| 2003/0126296 A1 * | 7/2003 | Aviles | ......................... | 709/250 |
| 2004/0030816 A1 * | 2/2004 | Knight et al. | .................. | 710/52 |
| 2004/0120335 A1 * | 6/2004 | Friesen et al. | ................ | 370/412 |
| 2005/0068974 A1 * | 3/2005 | Barker et al. | .................. | 370/419 |
| 2005/0149602 A1 * | 7/2005 | Venkatachalam et al. | ... | 709/200 |

OTHER PUBLICATIONS

U.S. Appl. No. 10/689,090, filed Oct. 20, 2003, K.S. Grant et al., "Traffic Management Using In-Band Flow Control and Multiple-Rate Traffic Shaping".
Agere Systems, Product Brief, "Edge/Access and Multiservice Network Processors: APP550 and APP530," pp. 1-4, May 2003.
Implementation Agreement: OIF-SPI3-01.0, "System Packet Interface Level 3 (SPI-3): OC-48 System Interface for Physical and Link Layer Devices," Optical Internetworking Forum, pp. 1-42, 2001.

* cited by examiner

*Primary Examiner*—Chi H. Pham
*Assistant Examiner*—Ahmed Elallam
(74) *Attorney, Agent, or Firm*—Ryan, Mason & Lewis, LLP (57) ABSTRACT

In a communication system comprising a link layer device connectable to one or more physical layer devices, at least a given one of a plurality of ports of the one or more physical layer devices is designated as a port for which status information is to be requested by the link layer device on a more frequent basis than such information is to be requested for one or more other ports of the plurality of ports. The ports are then polled by the link layer device in accordance with a non-linear polling sequence such that the at least one designated port is polled more frequently than the one or more other ports. The designated port may comprise a port to which the link layer device transmits data in conjunction with a current data transfer. The non-linear polling sequence may thus be altered dynamically based on particular data transfers that are occurring between a link layer device and a physical layer device in a communication system.

20 Claims, 4 Drawing Sheets

LINK LAYER DEVICE WITH NON-LINEAR POLLING OF MULTIPLE PHYSICAL LAYER DEVICE PORTS

FIELD OF THE INVENTION

The present invention relates generally to network-based communication systems, and more particularly to techniques for link layer device polling of ports associated with one or more physical layer devices in such systems.

BACKGROUND OF THE INVENTION

A network processor is one example of what is more generally referred to herein as a link layer device, where the term "link layer" generally denotes a switching function layer. Such link layer devices can be used to implement packet-based protocols, such as Internet Protocol (IP) and Asynchronous Transfer Mode (ATM), and are also commonly known as Layer-3 (L3) devices in accordance with the well-known Open System Interconnect (OSI) model.

Communication between a physical layer device and a network processor or other type of link layer device may be implemented in accordance with an interface standard, such as the SPI-3 interface standard described in Implementation Agreement OIF-SPI3-01.0, "System Packet Interface Level 3 (SPI-3): OC-48 System Interface for Physical and Link Layer Devices," Optical Internetworking Forum, 2001, which is incorporated by reference herein.

A given physical layer device may comprise a multiple-port device which communicates over multiple channels with the link layer device. Such communication channels, also commonly known as MPHYs, may be viewed as examples of what are more generally referred to herein as physical layer device ports. A given set of MPHYs that are coupled to a link layer device may comprise multiple ports associated with a single physical layer device, multiple ports each associated with one of a plurality of different physical layer devices, or combinations of such arrangements. As is well known, a link layer device may be advantageously configured to detect backpressure (BP) for a particular MPHY via polling of the corresponding MPHY address on its associated physical layer device. The detected backpressure is used by the link layer device to provide flow control and other traffic management functions, thereby improving link utilization.

U.S. patent application Ser. No. 10/689,090 filed Oct. 20, 2003 and entitled "Traffic Management Using In-band Flow Control and Multiple-rate Traffic Shaping," discloses improved techniques for communicating information between a link layer device and a physical layer device, so as to facilitate backpressure detection and related traffic management functions, particularly in high channel count (HCC) packet-based applications.

In a conventional arrangement based on the SPI-3 interface standard, a link layer device issues an address identifying a particular MPHY for which backpressure status is desired, and the physical layer device responds with the backpressure status of that MPHY. The backpressure status may be communicated, by way of example, as an indicator of one of two states, such as assertion of backpressure and de-assertion of backpressure, with assertion of backpressure indicating that there is backpressure at the MPHY, and de-assertion of backpressure indicating that there is no backpressure at the MPHY. The response should be provided to the link layer device as quickly as possible so that the link layer device does not overflow or underflow the physical layer device buffer corresponding to the particular MPHY.

Since the link layer device generally needs backpressure status from each of the MPHYs of the physical layer device, it polls the addresses of the various MPHYs in accordance with an established polling sequence.

A typical conventional arrangement involves polling all of the MPHYs of the physical layer device in a fixed polling sequence based on a linear numerical ordering of the MPHYs. For example, the polling sequence for an arrangement in which there is a total of four MPHYs denoted MPHY0, MPHY1, MPHY2 and MPHY3 would be MPHY0, MPHY1, MPHY2, MPHY3, MPHY0, MPHY1, MPHY2, MPHY3, MPHY0, and so on. The polling sequence will continue in this fixed linear manner regardless of the particular transfers that may be occurring on the interface bus between the link layer device and the physical layer device.

A problem arises in this conventional fixed linear polling approach when there are a large number of MPHYs. For example, certain arrangements may have 16, 32, 64 or up to 256 or more MPHYs. As indicated above, the backpressure response for a given MPHY should be provided to the link layer device as quickly as possible to prevent overflow of the associated buffer in the physical layer device. However, when there are a large number of MPHYs, the polling sequence may take an excessive amount of time to cycle through the full range of MPHYs. As a result, the time between receipt of updated backpressure status for any given one of the MPHYs by the link layer device is limited by the cycle time of the full polling sequence.

Previous attempts to overcome this problem generally either increase the buffer size in order to accommodate the maximum polling delay, or configure the interface bus to incorporate additional pins that may be used to relay backpressure status for a designated MPHY outside of the polling sequence.

One example of the latter approach in accordance with the SPI-3 standard is to configure the interface bus to include a direct transmit packet available (DTPA) pin for each MPHY. The DTPA feature provides a direct response to each MPHY, using one pin per MPHY, outside of the fixed linear polling sequence.

Another example of the latter approach in accordance with the SPI-3 standard is to configure the interface bus to include a selected transmit packet available (STPA) pin for each physical layer device interface. The STPA pin provides an indication of instantaneous first-in first-out (FIFO) buffer depth for a selected MPHY, again outside of the fixed linear polling sequence.

Unfortunately, the approaches which involve increasing buffer sizes or adding DTPA or STPA pins as described above fail to provide an adequate solution to the polling delay problem in that such approaches unduly increase the size, complexity and cost of the devices, particularly in applications involving large numbers of MPHYs. For example, with reference to the additional DTPA or STPA pin approach, an application involving 256 MPHYs would require up to 256 additional pins on the interface bus.

Accordingly, what is needed is an improved polling technique that overcomes the polling delay problem associated with fixed linear polling of a large number of MPHYs, while also avoiding the need for increased buffer sizes or additional interface pins.

SUMMARY OF THE INVENTION

The present invention avoids the delay problem associated with fixed linear polling of a large number of MPHYs or other physical layer device ports by providing an efficient and flexible non-linear polling approach which, in an illustrative embodiment, allows the polling sequence to be altered dynamically based on particular data transfers that are occurring between a link layer device and one or more physical layer devices in a communication system.

In accordance with one aspect of the invention, at least one of a plurality of ports of one or more physical layer devices is designated as a port for which status information is to be requested by the link layer device on a more frequent basis than such information is to be requested for one or more other ports of the plurality of ports. The ports are then polled in accordance with a non-linear polling sequence such that the at least one designated port is polled more frequently than the one or more other ports. The designated port may comprise a port to which the link layer device transmits data in conjunction with a current data transfer.

The non-linear polling sequence in the illustrative embodiment may comprise a sequence having a plurality of polling instances in which the designated port is polled on at least every other polling instance of the sequence. The polling instances may correspond to respective clock periods of a link layer device clock. Numerous other non-linear polling sequences can be used in implementing the invention.

Advantageously, the invention in the illustrative embodiment allows a link layer device to obtain more frequently updated backpressure status for particular MPHYs or other physical layer device ports than would otherwise be possible using conventional fixed sequential polling, but without requiring increased buffer sizes or additional interface pins.

DETAILED DESCRIPTION OF THE INVENTION

The invention will be illustrated herein in conjunction with an exemplary network-based communication system which includes a link layer device, a physical layer device and other elements configured in a particular manner. It should be understood, however, that the invention is more generally applicable to any system in which it is desirable to provide enhanced efficiency and flexibility in the polling of physical layer device ports by a link layer device.

A "link layer device" or LLD as the term is used herein refers generally to a network processor or other type of processor which performs processing operations associated with a link layer of a network-based system. Such a device may be implemented, by way of example and without limitation, utilizing a microprocessor, central processing unit (CPU), digital signal processor (DSP), application-specific integrated circuit (ASIC), or other type of data processing device, as well as portions or combinations of these and other devices.

A "physical layer device" or PLD as the term is used herein refers generally to a device which provides an interface between a link layer device and a physical transmission medium of a network-based system.

The term "non-linear polling" as used herein is intended to include any type of polling performed using a polling sequence other than a conventional fixed polling sequence based on a linear numerical ordering of physical layer device ports.

As indicated above, the conventional fixed linear polling approach is problematic in the case of large numbers of physical layer device ports or MPHYs, in that the address polling sequence may take an excessive amount of time to cycle through the full range of MPHYs, such that the time between receipt of updated backpressure status for any given one of the MPHYs by the link layer device is limited by the cycle time of the full polling sequence. Previous attempts to overcome this problem using larger buffers or additional interface bus pins are inadequate in that they unduly increase the size, complexity and cost of the devices.

The present invention solves the polling delay problem by providing in an illustrative embodiment a non-linear polling technique which advantageously avoids the need for increased buffer size or additional interface bus pins.

Figure 1:
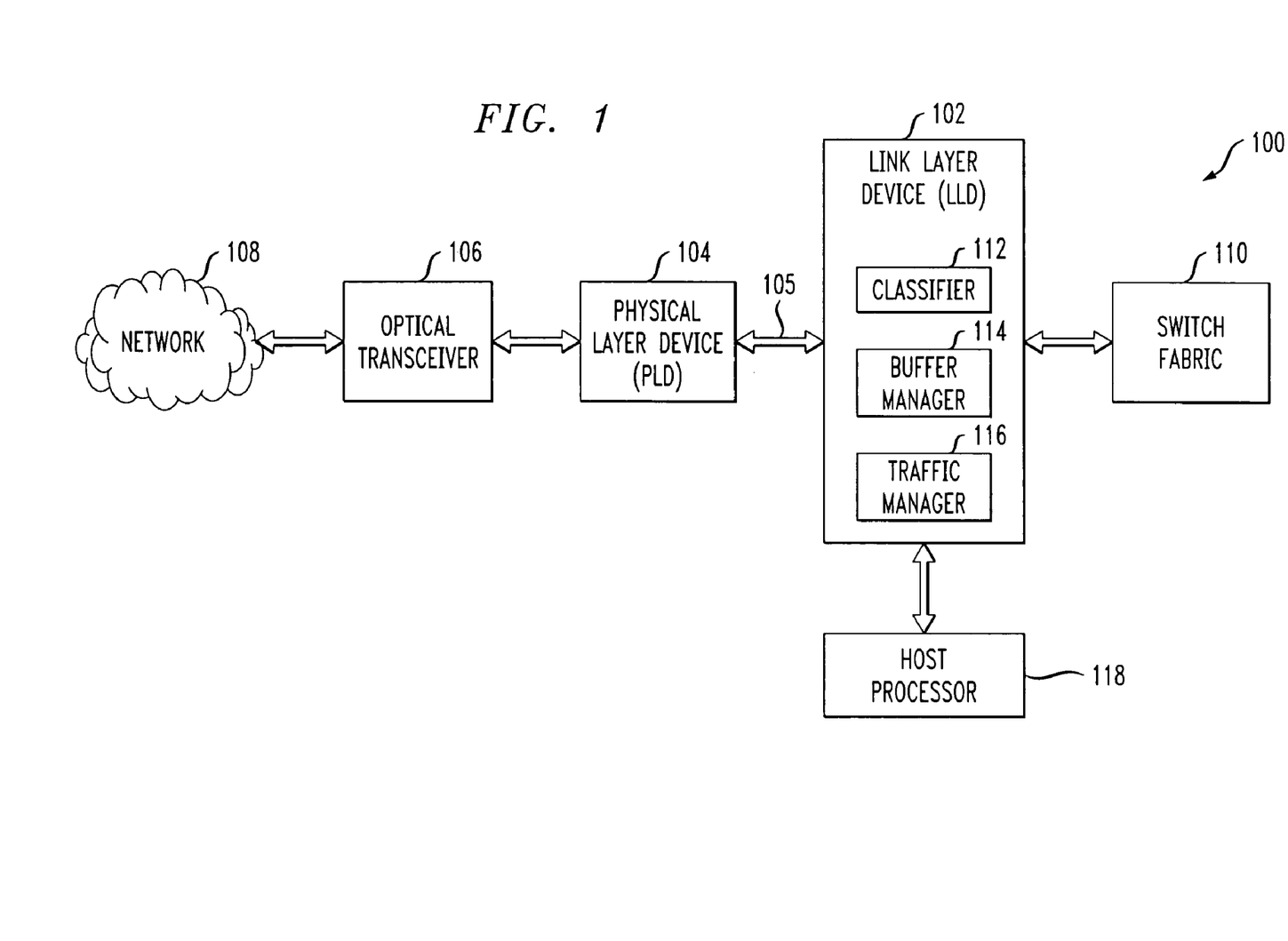
FIG. 1 is a simplified block diagram of a network-based communication system in which the present invention is implemented.

FIG. 1 shows a network-based communication system 100 in which the invention is implemented. The system 100 includes a link layer device (LLD) 102 coupled to a physical layer device (PLD) 104 via an interface 105. The PLD 104 is coupled via an optical transceiver 106 to a network 108. The LLD 102 is coupled to a switch fabric 10. The LLD 102 is configured to communicate packets, cells or other protocol data units (PDUs) between the network 108 and the switch fabric 110 which controls switching of PDU data. The PLD 104 and optical transceiver 106 serve to interface the LLD to physical transmission media of the network 108, which are assumed in this case to comprise optical transmission media.

The LLD 102 may comprise, for example, an otherwise conventional network processor such as a PayloadPlus® network processor in the APP500 or APP750 product family, commercially available from Agere Systems Inc. of Allentown, Pa., U.S.A., suitably modified to incorporate non-linear polling of physical layer device ports in the manner described herein.

The PLD 104 may comprise one or more devices suitable for providing access termination and aggregation for multiple services, or any other physical layer device of a type known to those skilled in the art. As noted above, ports of a physical layer device are also referred to herein as MPHYs, although the invention can be implemented using other types of physical layer device ports. A given set of MPHYs that are coupled to the LLD 102 may comprise multiple ports associated with a single physical layer device, multiple ports each associated with one of a plurality of different physical layer devices, or combinations of such arrangements. The PLD 104 may therefore be implemented as a plurality of physical layer devices.

The interface 105 between the LLD 102 and the PLD 104 preferably comprises an interface bus configured in accordance with the SPI-3 interface standard.

Figure 2:
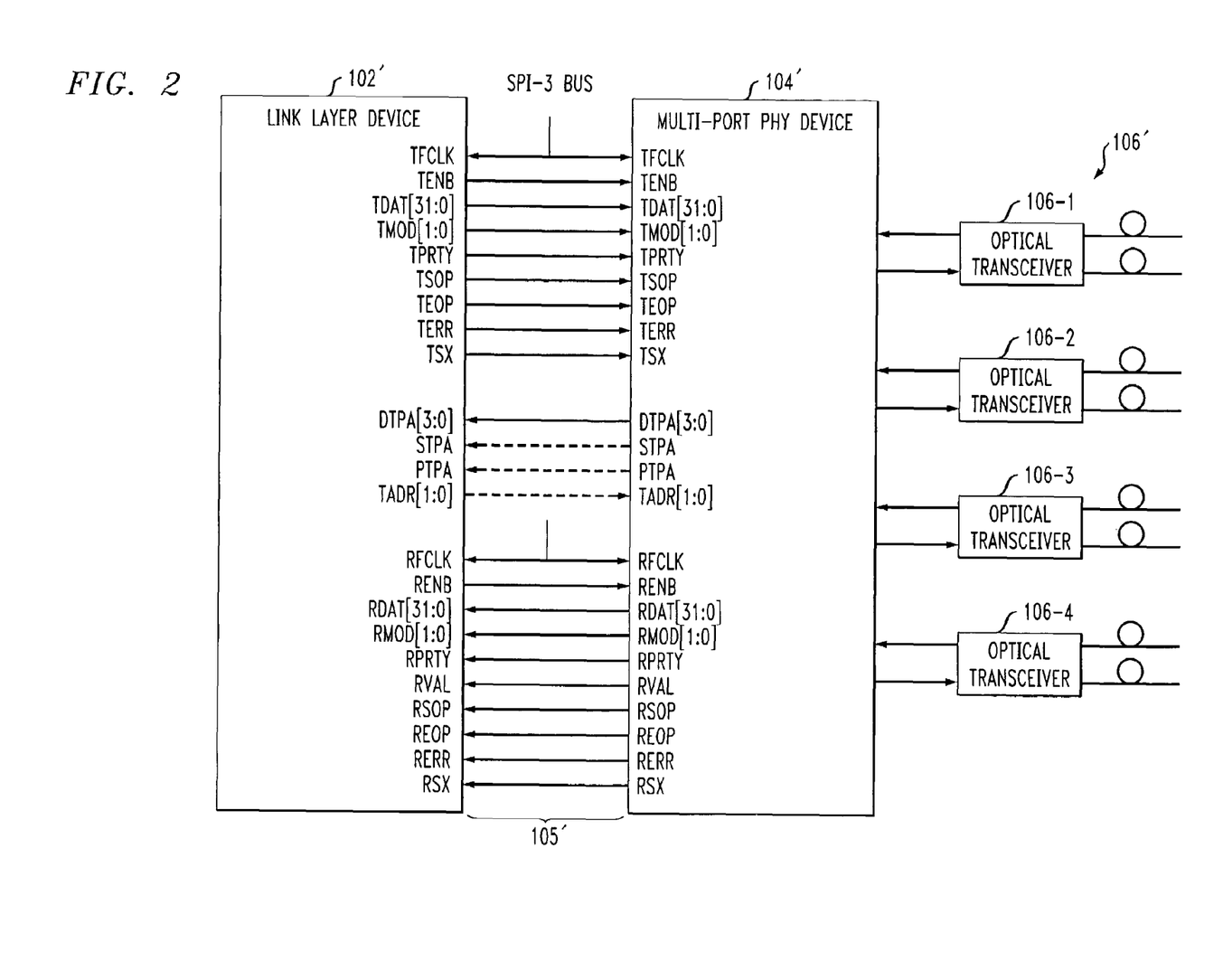
FIG. 2 shows a portion of communication system such as that shown in FIG. 1, illustrating an exemplary interface between a link layer device and a physical layer device that may be utilized in implementing the invention.

With reference now to FIG. 2, an exemplary SPI-3 interface bus 105' between an LLD 102' and a PLD 104' is shown. The PLD 104' is coupled to optical transceiver elements 106-1, 106-2, 106-3 and 106-4 of an optical transceiver 106'. The LLD 102', PLD 104', interface 105' and optical transceiver 106' may be viewed as particular examples of the general devices denoted herein as LLD 102, PLD 104, interface 105 and optical transceiver 106, respectively.

It can be seen that the SPI-3 interface in this exemplary configuration includes DTPA and STPA signal lines, of the type described previously herein. The interface further includes signal lines corresponding to transmit FIFO write clock (TFCLK), transmit address (TADR), transmit start of transfer (TSX), transmit write enable (TENB), polled transmit packet available (PTPA), and transmit packet data (TDAT). These and other signals associated with the SPI-3 interface bus of FIG. 2 are further described in the above-cited SPI-3 standard document. Particular examples of the corresponding signals will be shown in the timing diagrams of FIGS. 3 and 4.

Of course, the invention is not restricted to use with an SPI-3 interface bus such as that shown in FIG. 2, and other types of interface buses or interfaces could be used.

It is also to be appreciated that the invention is not limited to use with any particular type of LLD or PLD. Numerous such devices suitable for use with the present invention are well known to those skilled in the art. The conventional aspects of these devices will therefore not be described in detail herein.

Referring again to FIG. 1, the LLD 102 as shown includes a classifier 112, a buffer manager 114 and a traffic manager 116. Such elements may be implemented as otherwise conventional network processor elements of a type known to those skilled in the art. Also, these elements may be configured to incorporate in-band flow control and multiple-rate traffic shaping techniques of the type described in the above-cited U.S. patent application Ser. No. 10/689,090.

The LLD 102 will also generally include other elements of a type commonly found in a network processor or other type of LLD. For example, LLD 102 will typically include an internal memory, as well as an interface to an external memory. Such memory elements may be utilized for implementing PDU buffer memory, queuing and dispatch buffer memory, etc. The LLD may further include one or more memory controllers, as well as appropriate interface circuitry for interfacing with the PLD 104, the switch fabric 110, and other external devices, such as a host processor 118 which may be configured to communicate with the LLD over a standard bus architecture, e.g., a peripheral component interconnect (PCI) bus. The LLD may also include a scheduler, queuing and dispatch logic, as well as other conventional elements not explicitly shown in the figure. The operation of these and other conventional elements, being well understood by those skilled in the art, is not described in detail herein.

The PLD 104 may comprise a plurality of queues, including ingress queues and egress queues, as well as appropriate interface hardware for interfacing with the LLD 102 and the transceiver 106. In other embodiments, the transceiver 106 may be implemented within the PLD itself, such that the PLD interfaces directly with the network 108.

It is also possible that the LLD and the PLD may be integrated together into a single device, such as an ASIC. The terms LLD and PLD as used herein should therefore be understood to include any set of one or more functional components which perform respective LLD and PLD operations in a single device.

It will be assumed in describing the illustrative embodiment that the term "egress" refers to the direction of data transfer from the network 108 to user equipment. The egress direction relative to the PLD 104 is thus the direction of data transfer from the PLD interface with the LLD 102 to the PLD interface with the transceiver 106. Similarly, it will be assumed that the term "ingress" refers to the direction of data transfer from user equipment to the network 108. The ingress direction relative to the PLD 104 is thus the direction of data transfer from the PLD interface with the transceiver 106 to the PLD interface with the LLD 102. It should be understood that these and other assumptions made herein are for clarity and simplicity of description only, and should not be construed as constituting limitations of the invention.

It should also be noted that the particular arrangement of system elements shown in FIG. 1 is by way of illustrative example only. More particularly, the invention can be implemented in any type of system having at least one LLD and at least one PLD, and is not limited to the particular processing applications described herein. The system 100 may include other elements in addition to or in place of those specifically shown, including one or more elements of a type commonly found in a conventional implementation of such a system.

The non-linear polling techniques of the present invention as described herein may be implemented at least in part in the form of software program code. For example, these techniques may be implemented at least in part utilizing LLD or PLD elements that are programmable via instructions or other software. Programmable elements in the LLD may be configured utilizing software or other configuration information downloaded into such elements from the host processor 118. For example, configuration information specifying a particular type of non-linear polling may be downloaded into a memory of the LLD from the host processor in this manner. More specifically, a calendar table or other data structure stored in a memory of the LLD may be populated with the downloaded configuration information in order to provide the desired non-linear polling. The contents of the stored data structure may thus define an order in which ports are polled in accordance with a particular non-linear polling sequence. Multiple such data structures may be stored, and may be selectable under software control.

In accordance with one aspect of the invention, the LLD 102 is configured to designate at least one of a plurality of ports of the PLD 104 as a port for which status information is to be requested by the LLD on a more frequent basis than such information is to be requested for one or more other ports of the plurality of ports. The ports are then polled by the LLD in accordance with a non-linear polling sequence such that the at least one designated port is polled more frequently than the one or more other ports.

The status information may comprise backpressure status. For example, as indicated elsewhere herein, the backpressure status for a given one of the plurality of ports may comprise an indicator of one of at least two states of the given port, including a backpressure assertion state and a backpressure de-assertion state indicative of the respective presence or absence of backpressure at the given port.

The designated port that is polled more frequently than the one or more other ports by the LLD may comprise a port to which the LLD transmits data in conjunction with a current data transfer. For example, in conjunction with the commencement of a given data transfer, denoted herein as the current data transfer, the corresponding PLD port may be designated as the port that is polled more frequently than the one or more other ports by the LLD. This allows the LLD to obtain near-real-time backpressure status updates from the designated port, so as to facilitate rapid detection of an assertion of backpressure at the designated port, while also allowing the non-designated ports to indicate a de-assertion of backpressure to the LLD as they are polled in accordance with the non-linear sequence.

The non-linear polling sequence may comprise a sequence having a plurality of polling instances in which the designated port is polled on at least every other polling instance of the sequence. Referring again to the example described previously, in which there is a total of four MPHYs denoted MPHY0, MPHY1, MPHY2 and MPHY3, the non-linear polling sequence in a situation in which MPHY2 represents the designated port may be MPHY0, MPHY2, MPHY1, MPHY2, MPHY3, MPHY2, MPHY4, MPHY2, MPHY0, and so on. The polling sequence will continue in this non-linear manner as long as MPHY2 remains the designated port. Typically, this will be as long as the LLD is transmitting data to MPHY2 in conjunction with a current data transfer. Upon a subsequent data transfer, or under other specified conditions, another of the MPHYs may be designated, and thus polled more frequently than the other MPHYs.

The non-linear polling sequence example given above may be generalized as follows. Assume that the plurality of ports comprises a total of N ports, a variable i denotes a port-identifying index, $0 \leq i \leq N-1$, and the designated port is denoted as port j, $0 \leq j \leq N-1$, where $j \neq i$ and $j \neq (i+1) \bmod N$. In this case, one or more portions of the non-linear polling sequence may be viewed as comprising the sequence i, j, (i+1) mod N, j.

It is to be appreciated, however, that numerous other non-linear polling sequences may be used to ensure that a given designated PLD port is polled more frequently than the one or more other PLD ports.

As another example, again using a total of four MPHYs denoted MPHY0, MPHY1, MPHY2 and MPHY3, the non-linear polling sequence in a situation in which MPHY2 represents the designated port may be MPHY0, MPHY2, MPHY1, MPHY2, MPHY2, MPHY2, MPHY3, MPHY2, MPHY4, MPHY2, MPHY0 and so on. In this example, the designated port is polled more frequently than on every other polling instance of the sequence. As in the previous example, the polling sequence will continue in this non-linear manner as long as MPHY2 remains the designated port.

Figure 3:
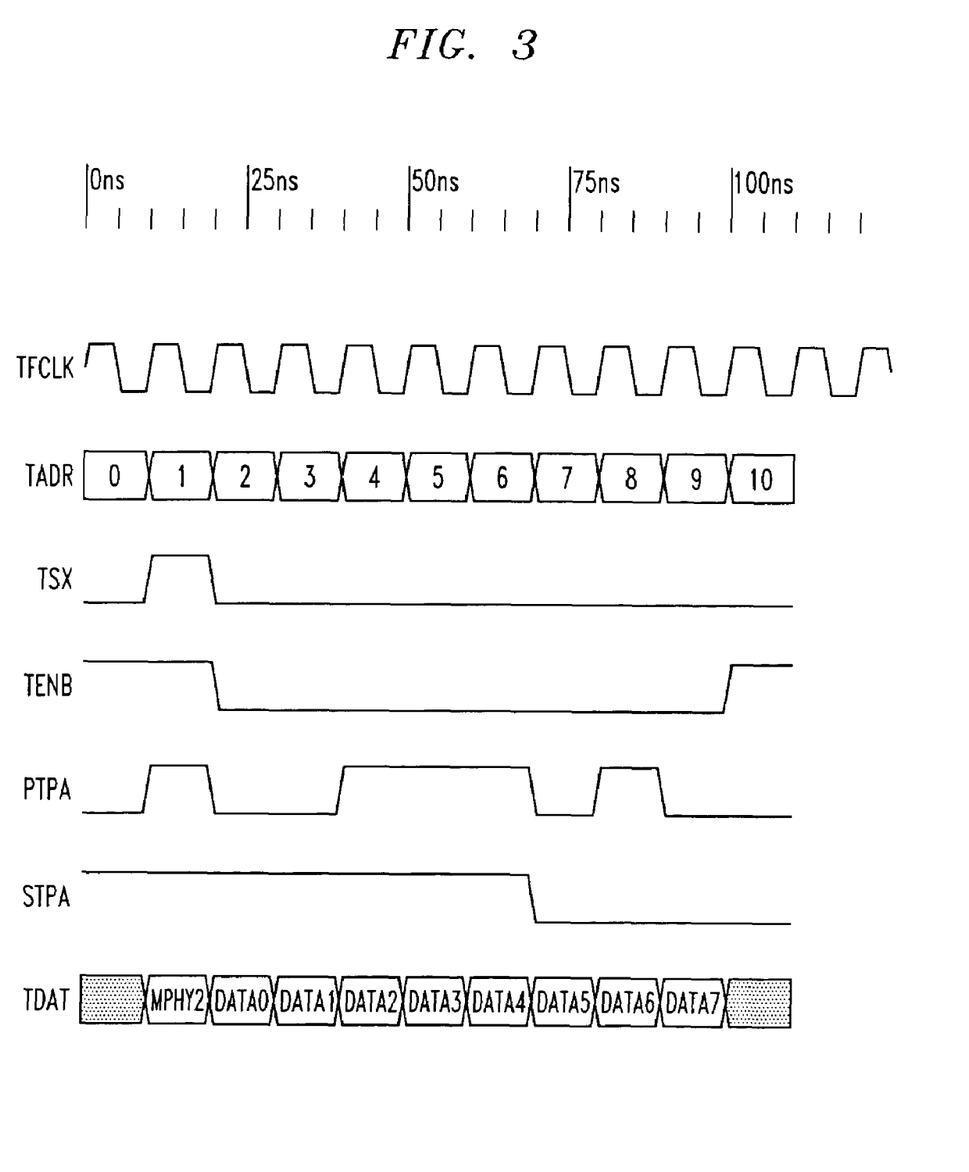
FIG. 3 is a timing diagram illustrating a conventional fixed linear polling technique implementable over the interface of FIG. 2.
Figure 4:
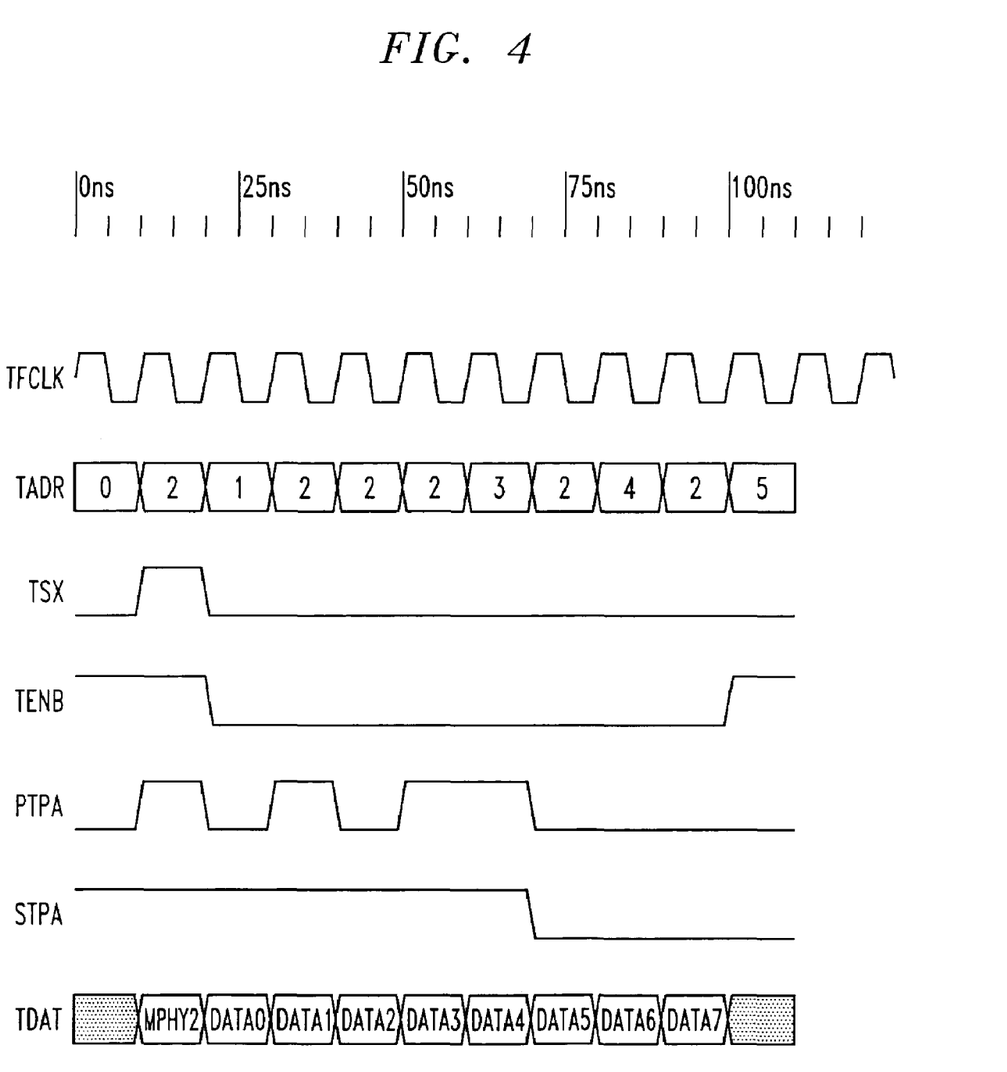
FIG. 4 is a timing diagram illustrating the operation of an exemplary non-linear polling technique implementable over the interface of FIG. 2 in accordance with the invention.

FIGS. 3 and 4 show timing diagrams that will be used to illustrate a more particular example of a non-linear polling technique in accordance with the invention. The technique to be illustrated is similar to that of the immediately previous example, in which the designated port is polled more frequently than on every other polling instance of the sequence. The particular signal configurations and their durations as shown in these timing diagrams are presented by way of example only, and should not be construed as limiting in any way.

Referring initially to FIG. 3, a conventional fixed linear polling technique implementable over the SPI-3 interface bus of FIG. 2 is shown. It can be seen that the TADR signal is configured such that multiple MPHYs are polled in a fixed linear sequence, namely, the order 0, 1, 2, 3, . . . 10 and so on.

FIG. 4 shows an exemplary non-linear polling technique implementable over the SPI-3 interface bus of FIG. 2 in accordance with the invention. In this example technique, MPHY2 is the particular MPHY designated for more frequent polling, and the TADR signal is configured such that multiple MPHYs are polled in a non-linear sequence, namely, the order 0, 2, 1, 2, 2, 2, 3, 2, 4, 2, 5 and so on.

The operation of the other signals shown in FIGS. 3 and 4 is consistent with their operation as described in the SPI-3 standard, and will therefore not be addressed in further detail herein.

As is apparent from the foregoing, the present invention in the illustrative embodiment provides an efficient and flexible non-linear polling approach which allows the polling sequence to be altered dynamically based on particular data transfers that are occurring between the LLD and certain PLD ports in the communication system of FIG. 1.

Each of the polling instances referred to above may correspond to a clock period of a data transfer clock, an interface clock or other clock of the LLD. In this case, the non-linear polling sequence may be viewed as being configured such that the designated port is polled on every other clock period of the LLD clock.

Use of a non-linear polling sequence in accordance with the invention may be alternated with use of a conventional linear polling sequence, based on the state of the interface bus 105 between the LLD 102 and the PLD 104. For example, a non-linear polling sequence may be utilized only in conjunction with the transfer of data from the LLD to one or more of the PLD ports over the interface bus, while a linear polling sequence is utilized in the absence of the transfer of data from the LLD to one or more of the PLD ports over the interface bus.

Advantageously, the use of a non-linear polling sequence in accordance with the invention serves to reduce a status reporting latency for the designated port relative to that associated with use of a linear polling sequence. In the example above, an assertion of backpressure from the designated port can be more rapidly detected by the LLD, because that port is polled more frequently than the other ports during the data transfer phase. This advantage is obtained at the expense of a small increase in the amount of time that may be required for the LLD to detect a de-assertion of backpressure by one of the non-designated ports. However, in the case of a large number of MPHYs, it is generally more critical to system performance to provide reduced latency in detecting an assertion of backpressure than in detecting a de-assertion of backpressure. This is because the LLD and the interface bus are generally operating at a much higher bandwidth than any individual MPHY. A related advantage of the non-linear polling sequence is that it places a strict bound on an amount of data transferrable by the LLD to the designated port over the interface bus subsequent to the designated port entering a backpressure assertion state.

It is therefore apparent that the illustrative embodiment advantageously avoids the problems associated with conventional fixed linear polling, without requiring increased buffer size or additional interface bus address pins.

Another advantage of the illustrative embodiment described above is that the non-linear polling techniques may be implemented using an otherwise standard interface between the LLD and the PLD, such as an SPI-3 interface.

An LLD or PLD in accordance with the invention may be implemented as an integrated circuit device suitable for installation on a line card or port card of a router or switch. Numerous other configurations are possible.

Again, it should be emphasized that the embodiments of the invention as described herein are intended to be illustrative only. For example, the SPI-3 interface used in the illustrative embodiment of FIG. 2 may be replaced with another type of standard interface, or a non-standard interface, as well as combinations of standard and non-standard interfaces. Also, the particular arrangement of link layer device, physical layer device, interface bus, device ports, device pins, signal lines and associated signals as shown in FIG. 2 may be varied in alternative embodiments. Furthermore, a wide variety of other types of non-linear polling sequences may be used in alternative embodiments, such as sequences in which two or more ports are each designated for more frequent polling than other ports in a given plurality of ports. In this type of arrangement, the two or more designated ports may each have a different polling rate, or may share a common polling rate. Also, criteria other than current data transfers may be used to determine which port or ports in a given set of ports should be designated for more frequent polling than other ports in the set. These and numerous other alternative embodiments within the scope of the following claims will be readily apparent to those skilled in the art.

What is claimed is:

1. A method for link layer device polling of a plurality of ports of one or more physical layer devices connectable to the link layer device in a communication system, the method comprising the steps of:

designating at least one of the plurality of ports as a port for which status information is to be requested by the link layer device on a more frequent basis than such information is to be requested for one or more other ports of the plurality of ports; and polling the plurality of ports in accordance with a non-linear polling sequence such that the at least one designated port is polled more frequently than the one or more other ports;

wherein the non-linear polling sequence continues for a period of time during which the at least one designated port remains so designated; and wherein said sequence includes multiple polling instances at least two of which involve polling of a given such designated port.

2. The method of claim 1 wherein the status information comprises backpressure status.

3. The method of claim 1 wherein the backpressure status for a given one of the plurality of ports comprises an indicator of one of at least two states of the given port, including a backpressure assertion state and a backpressure de-assertion state indicative of the respective presence or absence of backpressure at the given port.

4. The method of claim 1 wherein the link layer device communicates with the one or more physical layer devices over an interface bus configured in accordance with an SPI-3 interface standard.

5. The method of claim 1 wherein the designated port comprises a port to which the link layer device transmits data in conjunction with a current data transfer.

6. The method of claim 1 wherein the non-linear polling sequence is utilized only in conjunction with transfer of data from the link layer device to at least one of the plurality of ports over an interface bus.

7. The method of claim 1 wherein a linear polling sequence is utilized in the absence of transfer of data from the link layer device to at least one of the plurality of ports over an interface bus.

8. The method of claim 1 wherein the non-linear polling sequence is configured so as to reduce a status reporting latency for the designated port relative to that associated with use of a linear polling sequence.

9. The method of claim 1 wherein the non-linear polling sequence is configured so as to limit an amount of data transferable by the link layer device to the designated port over an interface bus subsequent to the port entering a backpressure assertion state.

10. The method of claim 1 wherein each of the plurality of ports comprises a port of a single physical layer device connectable to the link layer device.

11. The method of claim 1 wherein a first subset of the plurality of ports comprises one or more ports of a first physical layer device connectable to the link layer device, and a second subset of the plurality of ports comprises one or more ports of a second physical layer device connectable to the link layer device.

12. The method of claim 1 wherein the link layer device comprises a network processor.

13. The method of claim 1 wherein the non-linear polling sequence is established in accordance with configuration information downloaded to the link layer device from an external processor.

14. The method of claim 13 wherein the configuration information is stored in a data structure in a memory of the link layer device, the contents of the data structure defining an order in which the ports are polled in accordance with the non-linear polling sequence.

15. The method of claim 14 wherein the data structure comprises a calendar table.

16. A method for link layer device polling of a plurality of ports of one or more physical layer devices connectable to the link layer device in a communication system, the method comprising the steps of:

designating at least one of the plurality of ports as a port for which status information is to be requested by the link layer device on a more frequent basis than such information is to be requested for one or more other ports of the plurality of ports; and polling the plurality of ports in accordance with a non-linear polling sequence such that the at least one designated port is polled more frequently than the one or more other ports;

wherein the non-linear polling sequence comprises a sequence having a plurality of polling instances in which the designated port is polled on at least every other polling instance of the sequence.

17. A method for link layer device polling of a plurality of ports of one or more physical layer devices connectable to the link layer device in a communication system, the method comprising the steps of:

designating at least one of the plurality of ports as a port for which status information is to be requested by the link layer device on a more frequent basis than such information is to be requested for one or more other ports of the plurality of ports; and polling the plurality of ports in accordance with a non-linear polling sequence such that the at least one designated port is polled more frequently than the one or more other ports;

wherein the non-linear polling sequence comprises a sequence in which the designated port is polled on at least every other clock period of a clock of the link layer device.

18. A method for link layer device polling of a plurality of ports of one or more physical layer devices connectable to the link layer device in a communication system, the method comprising the steps of:

designating at least one of the plurality of ports as a port for which status information is to be requested by the link layer device on a more frequent basis than such information is to be requested for one or more other ports of the plurality of ports; and polling the plurality of ports in accordance with a non-linear polling sequence such that the at least one designated port is polled more frequently than the one or more other ports;

wherein the plurality of ports comprises N ports, a variable i denotes a port-identifying index $0 \leq i \leq N-1$, and the designated port is denoted as port j, $0 \leq j \leq N-1$, where $j \neq i$ and $j \neq (i+1) \bmod N$, a portion of the non-linear polling sequence comprising the sequence i,j, (i+1) mod N,j.

19. An apparatus for polling of a plurality of ports of one or more physical layer devices in a communication system, the apparatus comprising:

a link layer device connectable to the one or more physical layer devices;

the link layer device being operative to designate at least one of the plurality of ports as a port for which status information is to be requested by the link layer device on a more frequent basis than such information is to be requested for one or more other ports of the plurality of ports; and the link layer device being operative to poll the plurality of ports in accordance with a non-linear polling sequence such that the at least one designated port is polled more frequently than the one or more other ports;

wherein the non-linear polling sequence continues for a period of time during which the at least one designated port remains so designated; and wherein said sequence includes multiple polling instances at least two of which involve polling of a given such designated port.

20. An article of manufacture comprising a machine-readable storage medium having one or more software programs stored therein, for use in link layer device polling of a plurality of ports of one or more physical layer devices connectable to the link layer device in a communication system, the link layer device being operative under control of the one or more software programs to perform the steps of:

designating at least one of the plurality of ports as a port for which status information is to be requested by the link layer device on a more frequent basis than such information is to be requested for one or more other ports of the plurality of ports; and polling the plurality of ports in accordance with a non-linear polling sequence such that the at least one designated port is polled more frequently than the one or more other ports;

wherein the non-linear polling sequence continues for a period of time during which the at least one designated port remains so designated; and wherein said sequence includes multiple polling instances at least two of which involve polling of a given such designated port.

* * * * *